United States Patent [19]
Campbell et al.

[11] 3,731,264
[45] May 1, 1973

[54] APPARATUS FOR DETERMINING THE POSITION OF A SURFACE VESSEL WITH RESPECT TO A SIGNAL SOURCE

[75] Inventors: Leslie T. Campbell, Lakewood; Joseph J. Vetter, Monrovia, both of Calif.

[73] Assignee: The United States of America as represented by the Secretary of the Navy

[22] Filed: Jan. 24, 1972

[21] Appl. No.: 219,964

[52] U.S. Cl. ..................... 340/3 PS, 340/6 R, 340/8 S
[51] Int. Cl. ................................................. G01s 3/80
[58] Field of Search ..................... 340/3 R, 6 R, 3 PS, 340/8 S; 181/0.5 A

[56] References Cited

UNITED STATES PATENTS

| | | | |
|---|---|---|---|
| 2,019,497 | 11/1935 | Kuntze | 181/0.5 |
| 2,426,657 | 9/1947 | Williams | 340/3 PS X |

Primary Examiner—Richard A. Farley
Attorney—Richard S. Sciascia et al.

[57] ABSTRACT

Apparatus for determining the position in azimuth of a surface vessel, with respect to an underwater sonar signal source, irrespective of the motion of the surface vessel, comprising a hydrophone, capable of determining the azimuth of an underwater sonar signal source with respect to the roll and pitch axes of the surface vessel, and a universal joint, connecting the hydrophone to the surface vessel, its two axes of rotation being parallel to the roll and pitch axes of the surface vessel, thereby effectively permitting the hydrophone to rotate about the roll and pitch axes of the surface vessel. A vertical reference, attached to the hydrophone so as to pitch and roll with it, comprises a roll sensor and a pitch sensor for determining the roll and pitch, respectively, of the hydrophone. A roll summer and a pitch summer, whose two inputs are the outputs from the hydrophone and the roll sensor and pitch sensor, respectively, serve to determine the true azimuth of the sonar signal source, with respect to the roll and pitch axes of the surface ship, in spite of any roll or pitch of the hydrophone, or of the surface vessel.

7 Claims, 11 Drawing Figures

SCHEMATIC DIAGRAM OF POSITION-DETERMINING SYSTEM.

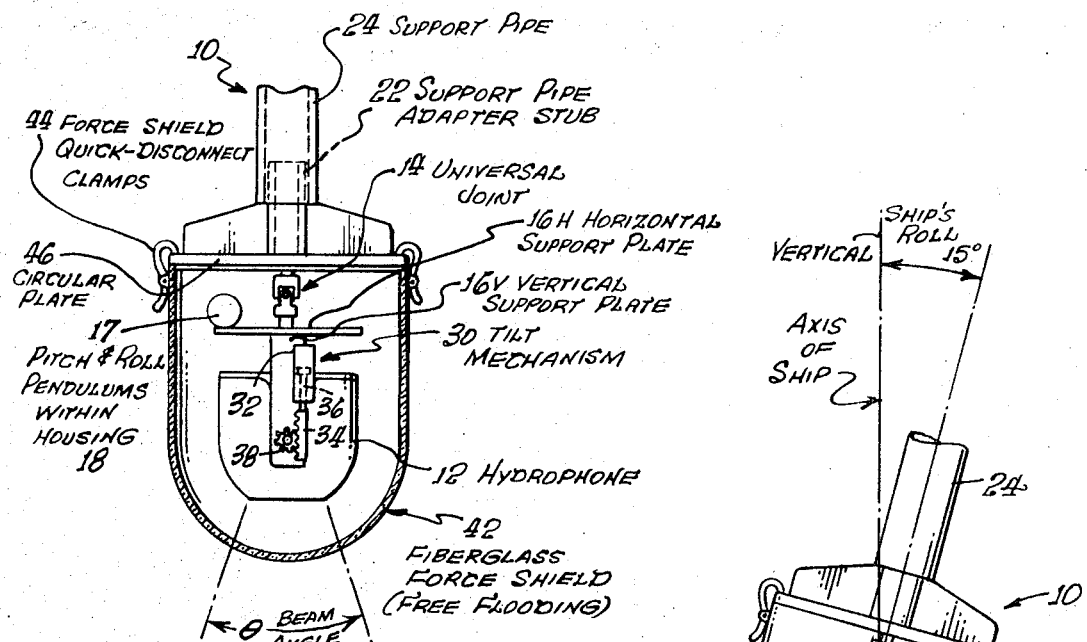
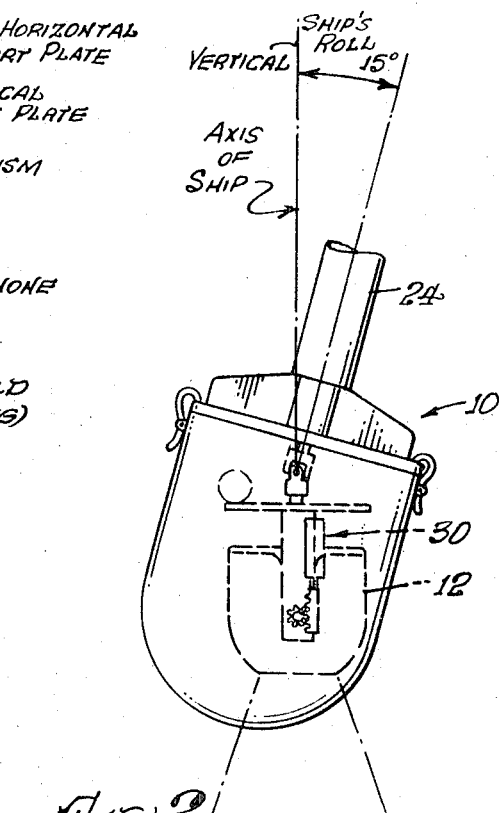
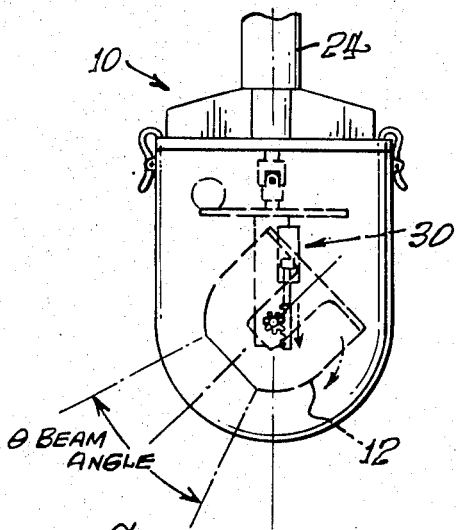

LOCATION OF POSITION-DETERMINING APPARATUS IN SHIP.

FIG. 5A. ELEVATION

FIG. 5B. PLAN VIEW

POSITION OF SUPPORT VEHICLE WITH RESPECT TO SIGNAL SOURCES.

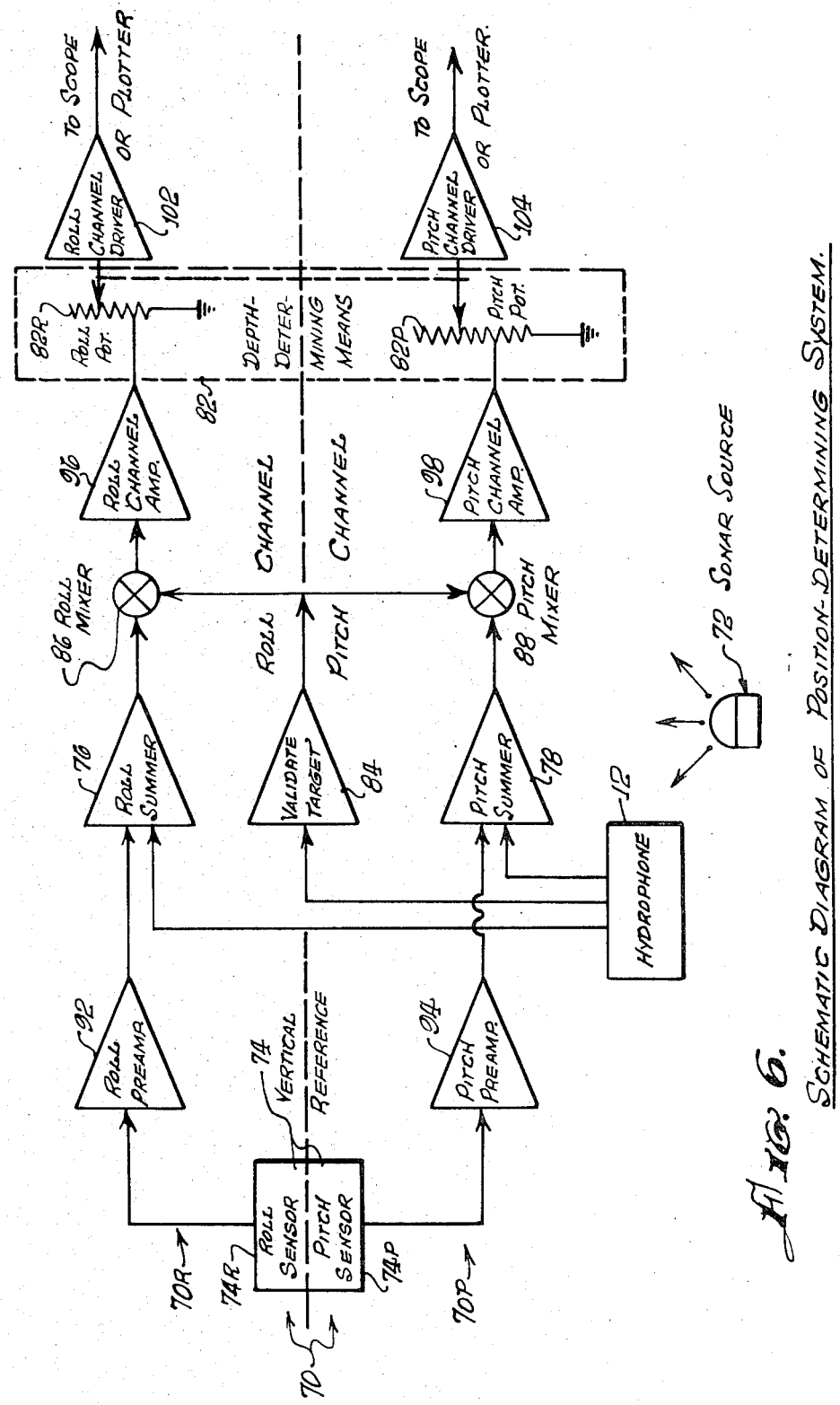
FIG. 6. SCHEMATIC DIAGRAM OF POSITION-DETERMINING SYSTEM.

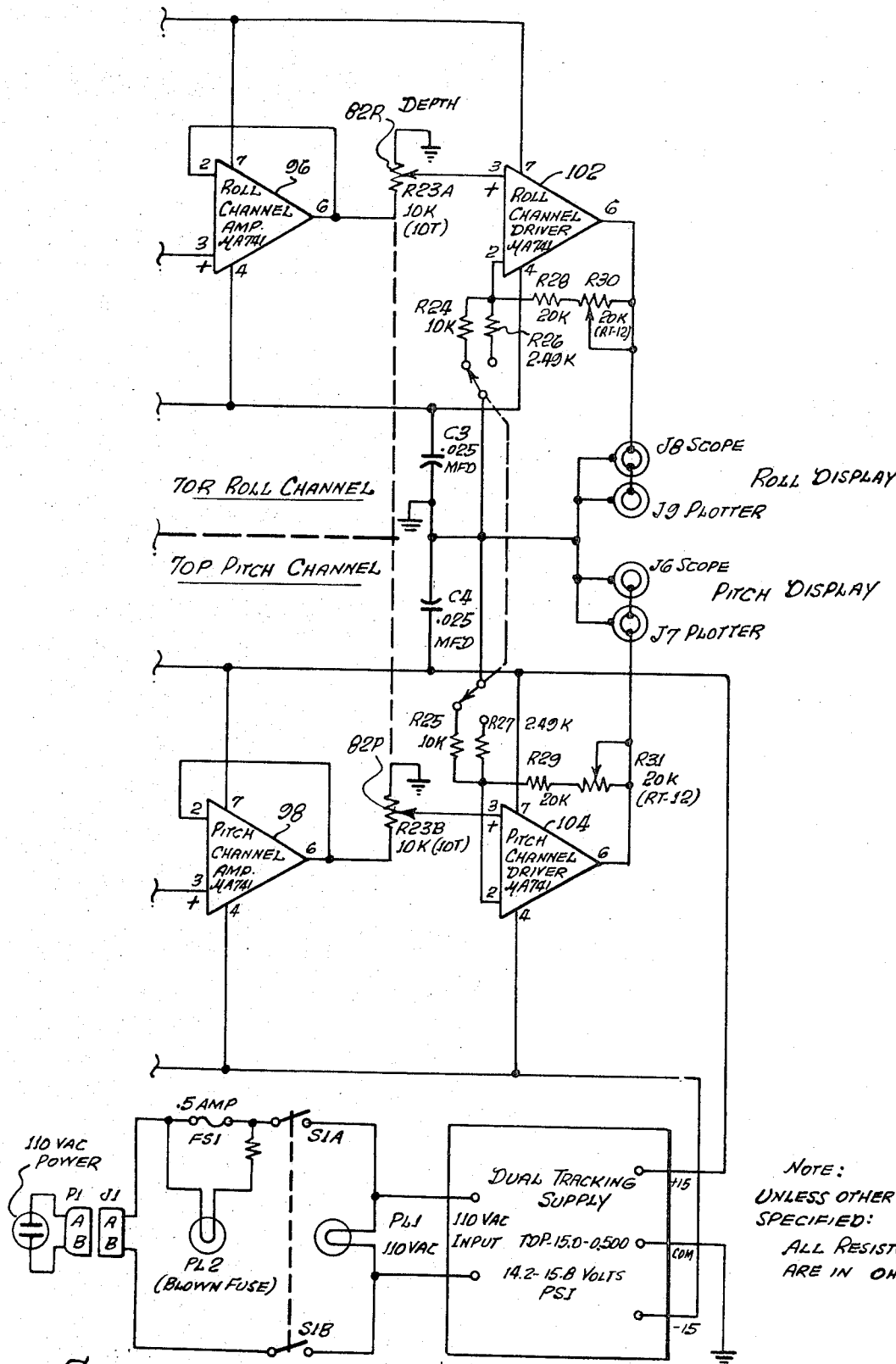
FIG. 7B. CIRCUIT DIAGRAM OF POSITION-DETERMINING APPARATUS.

CIRCUIT DIAGRAM OF POSITION-DETERMINING APPARATUS.

3,731,264

APPARATUS FOR DETERMINING THE POSITION OF A SURFACE VESSEL WITH RESPECT TO A SIGNAL SOURCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an apparatus which enables a surface vessel to locate, track, and navigate over a cooperative target, such as a bottom-implanted beacon, a torpedo with an activated pinger, or any manned or unmanned submersible having an active sonar signal source.

The method presently being used in the recovery of torpedoes is by use of a boat-mounted acoustic locating device. This prior art gear comprises a hydrophone and parabolic reflector which is suspended by a pipe over the side of the surface vessel, and trained in azimuth until the strongest signal is observed to indicate the general relative bearing of the signal source with respect to the support vessel. Due to the characteristics of the beam pattern of the hydrophone, pitch and roll errors of the support vessel, and errors due to human factors, the prior art gear is barely adequate for the task in water depths up to 1500 feet. The gear is almost completely useless in water depths of 3000 feet or more.

A further disadvantage of the prior art gear is that the response time of its training mechanism is too slow to allow for rapid signal location and tracking.

Accuracies of the gear being described diminish to zero when the surface vessel is directly over the signal source.

In the prior art, the hydrophone with its transducer is mounted to the hull of the ship, with a pendulum potentiometer also attached to the hull of the ship. This type of prior art system has disadvantages. As the ship rolls, the beam pattern, the pattern of the dot on the scope, the dot representing the target, rolls with it, and even though the system may be stabilized, and the dot returned to the origin of the system, when the ship is tilted, say 10°, due to roll, the beam pattern is also tilted the same amount.

In this invention, the use of the universal joint permits the hydrophone to maintain a vertical reference, and the beam pattern also maintains a vertical reference. Hence, the most accurate part of the beam pattern is used.

In addition, if the pitch and roll pendulums are placed on the hydrophone, so that they only have to sense a very small pitch and roll error, rather than the ship's much larger pitch and roll errors, a very accurate system results.

A major difference between another prior art invention which also includes a universal joint and that of applicant's is that the prior art invention is power-operated, hydraulically, whereas the present invention is not, since its own weight stabilizes it. This prior art invention requires actuating power to restore the structure below the universal joint to a vertical position because of the considerable friction between an O-ring and the surfaces of the universal joint that the O-ring makes contact with. While not specifically stated, most probably this excessive friction is required to provide required mechanical damping for the system.

The apparatus of this invention can be used to locate, track and "station-keep" an underwater object, with appropriate accessory equipment.

The term "station-keep" relates to maintaining a vessel, "the station," at a fixed positional relationship with an object at the bottom of the ocean, either directly above the object, or with known horizontal azimuth and range values, that is, with known $x$ and $y$ coordinates, with respect to the object.

If a signal source at a certain spot on the ocean floor can be located in $x$ and $y$ coordinates by the system of this invention, then the use of the accessory equipment will permit maintaining the information about the position of the object, that is, it will permit "position-keeping", or tracking the object.

The maintaining of the ship at a constant positional relationship with a beacon implanted at the bottom of the ocean would be useful in oil well drilling in the ocean.

SUMMARY OF THE INVENTION

This invention relates to apparatus for use with a support vehicle for locating an underwater, cooperative, signal source emitting a signal, such as a torpedo with an activated pinger, comprising a hydrophone free to swivel about a universal joint, one end of which is attached to the support vehicle, providing a vertical reference for the hydrophone, and capable of detecting the direction, in terms of $x$ and $y$ coordinates for example, of the source of the signal. The universal joint serves to compensate for the support vehicle's pitch and roll. Pitch and roll pendulum potentiometers, attached to the hydrophone, serve for detecting its pitch and roll. A vertical reference circuit, connected to the pitch and roll potentiometers, transduces the values of the pitch and roll into corresponding electrical signals. A filter circuit, connected to the hydrophone, filters the frequency of the signal source, and a receiver connected to the filter amplifies the filtered frequency. An angle indicator, connected to the receiver, indicates the direction of the signal source in terms of one of the coordinate axes. A depth indicator determines the depth of the signal source. A summing network, having as inputs an electrical signal (1) from the angle indicator, (2) from the vertical reference circuit, and (3) from the depth indicator, forms an electrical output which is a measure of the coordinates of the signal source with respect to the coordinates of the support vehicle. Finally, a switching network, having as its input the output of the summing network, has an output which is adaptable for connection to a visual display device.

Most, as much as 95 percent, of the ship's pitch and roll motion is cancelled out by the pendulum action of the hydrophone hanging from the universal joint. The remainder of the ship's pitch and roll, which is now hydrophone pitch and roll, is fed to the summing network to cancel out signal errors due to hydrophone pitch and roll. The advantage of this method is that errors due to pitch and roll are greatly attenuated and are much easier to compensate for. Also, the most accurate portion of the hydrophone beam pattern is maintained in the vertical plane, thus increasing the accuracy of locating, tracking and navigating over an acoustic source. A depth input, such as from a fathometer, is necessary in order to establish the horizontal range of the acoustic source.

OBJECTS OF THE INVENTION

An object of the invention is to provide an apparatus for determining the position in azimuth of a surface vessel, with respect to an underwater sonar signal source, which is not affected by motion of the surface vessel or of the hydrophone used to detect a signal from the source.

Another object of the invention is to provide a position-determining apparatus which is useful at depths of 3000 feet and more.

Still another object of the invention is to provide a position-determining apparatus which is useful regardless of the positional relationship of the vessel to the signal source.

Yet another object of the invention is to provide a position-determining apparatus which does not require sophisticated servo devices and actuators to restore the hydrophone to a desired position.

Other objects, advantages, and novel features of the invention will become apparent from the following detailed description of the invention when considered in conjunction with the accompanying drawings, wherein:

BRIEF DESCRIPTION OF THE DRAWINGS

FIG. 1 is a cross-sectional view of the basic components of the position-determining apparatus of this invention.

FIG. 2 is a side view of the position-determining apparatus of this invention showing the effect of roll on the apparatus.

FIG. 3 is a side view of the position-determining apparatus with the hydrophone oriented at an angle to the vertical.

FIG. 6 is a schematic diagram of the position-determining apparatus.

FIG. 1 shows the basic components of the position-determining apparatus 10 of this invention. The hydrophone 12 is suspended in the vertical plane from a universal joint 14, whose other end is fixed to a horizontal support plate 16. A pitch and roll pendulum potentiometer is housed in a waterproof housing 18 on the hydrophone support plate 16.

Figure 4:
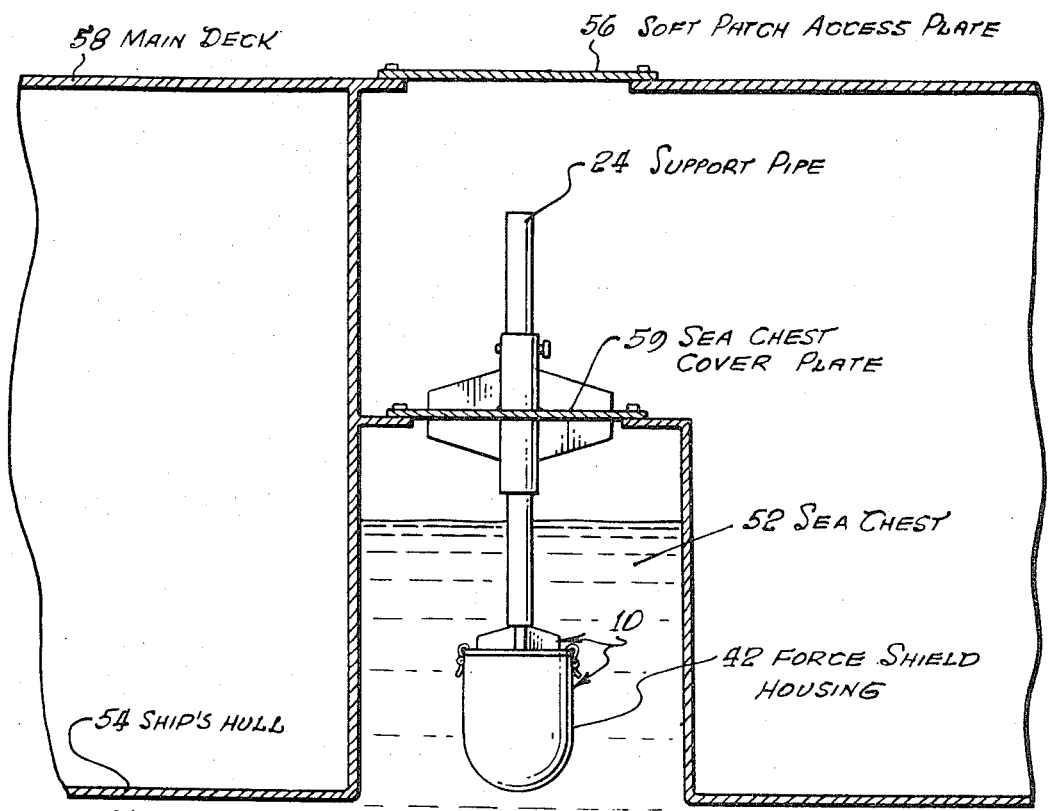
FIG. 4 is a side view showing the positional relationship of the apparatus of this invention with respect to the surface vessel.

The pitch and roll sensors are attached mechanically to the hydrophone 12. Whenever the hydrophone 12 pitches or rolls, the pitch and roll sensors produce d-c output voltages which are proportional to the amount of pitch or roll, which voltages are then fed into the pitch and roll summers (FIG. 6), after being amplified by pitch and roll preamps.

A support-type adaptor stub 22 connects the other end of the universal joint 14 to a support pipe 24. The purpose of the support pipe 24 is to permit lowering and raising of the apparatus 10, the support pipe not being absolutely essential.

However, use of the support pipe 24 permits ease of transferring of the apparatus 10 from one vessel to another, and facilitates adapting it for use from one vessel to another.

A tilt mechanism 30, comprises a cylinder 32 fixedly attached to the vertical support plate 16V, a rack 34, connected to a piston 36, and a fixed pinion 38. Movement of the rack 34 causes a rotation of the hydrophone 12 about the pinion 38. The tilt mechanism 30 is mechanically tied to the hydrophone 12 so that, when the hydrophone tilts, the vertical reference, comprising the pitch and roll sensors, senses that tilt. It is electrically tied back to the summing network to cancel out the effect of the tilt, as seen on the scope or x-y plotter.

The entire hydrophone assembly 10, including the pitch and roll housing 18, the universal joint 14, the horizontal support plate 16H, and the tilt mechanism 30, are completely encased within a free-flooding force shield housing 42. The use of the fiber glass force shield 42, with its feature of free flooding of its interior, eliminates the necessity of using the apparatus 10 in a well.

Force shield quick-disconnect clamps 44 connect the force shield housing 42 to a circular plate 46, which in turn is attached to support pipe adaptor stub 22.

Referring now to FIG. 2, this figure shows the effect of roll on the position-determining apparatus 10. It will be noted that the hydrophone 12 remains in a vertical position even though the support pipe 24 is tilted at an angle of 15° with respect to the vertical.

FIG. 3 shows a situation wherein the position-determining apparatus 10 has the hydrophone 12 oriented in a manner so that the hydrophone beam angle $\theta$ is no longer symmetrical about the vertical line. This Rho-Theta oriented operation is similar to the x-y oriented operation except that the hydrophone 12 is tilted at various angles by the tilt mechanism 30 for the purpose of locating acoustic sources not in the vertical beam pattern.

The indicators are either x- and y-coordinate indicators or $\rho$ and $\theta$ indicators.

FIG. 4 shows the location of the position-determining apparatus 10 with respect to the structure of the ship itself. In a specific embodiment, the apparatus 10 was located in a sea chest 52, which is a recess in the ship's hull 54. A soft patch access plate 56, forming an opening in the main deck 58, and a sea chest cover plate 59 permit access to, or removal of, the apparatus 10.

Figure 5:
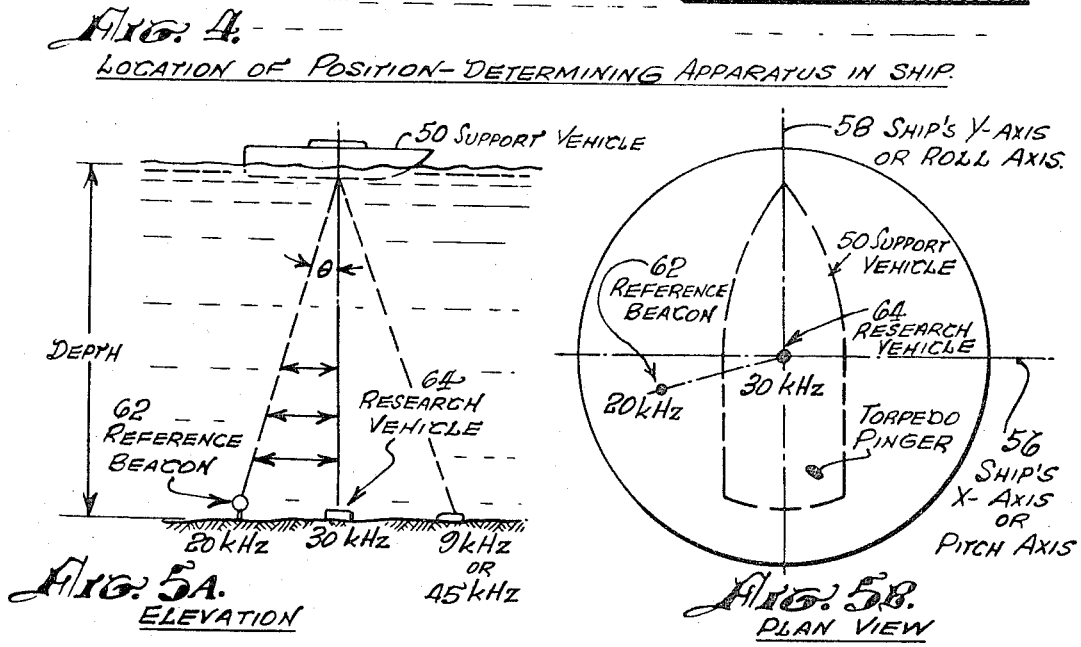
FIG. 5 consists of an elevational and plan view showing the position of the support vessel with respect to the signal sources.

Referring now to FIG. 5, this figure shows an elevational and plan view of the position of the support vessel 50 with respect to the various signal sources which may be used, and their relationships to the ship's x-axis 56, or pitch axis, and the ship's y-axis 58, or roll axis.

In a specific embodiment, the hydrophone 12 was able to detect two different signal frequencies, emitted by two different signal sources. Assume that a 20KHz signal is emitted by a reference beacon 62 placed at the bottom of the ocean and that a 30kHz signal is on a research vehicle 64. Assume that the research vehicle is to be tracked, and it is placed directly below the support vessel 50.

On the scope, a dot would be seen at the intersection of the x and y coordinate axes, 56 and 58, with this juxtaposition of the research vehicle 64 and the support ship 50, to which it is connected by a cable. When the research vehicle 64 moves, the dot on the scope moves correspondingly.

The purpose of the use of the two frequencies is to facilitate the use of two dots on the scope, one dot, the one generated by the beacon 62 remaining fixed during a search of a specific area of the ocean floor, and the other dot being generated by the sonar on the search vehicle 64 moving as the research vehicle moves.

If the frequency of the sonar equipment on the research vehicle 64 is changed to 20 kHz, the same frequency as that of the bottom-implanted beacon 62, the dot on the scope will appear at the same place for both signal sources, if the position of the research vehicle has not changed with respect to the beacon. However, if the research vehicle 64 searches the area about the beacon 62, then the spot on the scope will move to correspond with the movement of the research vehicle, and the relative motion of the research vehicle with respect to the beacon will be evidenced by a corresponding motion of the spot formed by the sonar on the research vehicle with respect to the spot at the origin caused by the beacon, thereby, a given area about the beacon 62 may be systematically searched.

Assuming the sought-after target has not been found, the surface support vessel 50 may be repositioned, and the research vehicle 64 may search another area with respect to the reference beacon 62.

A third frequency may be added, from another signal source, for example from a 9 kHz torpedo pinger, although this mode of use would merely enable another dot to be spotted on the scope.

The invention is primarily applicable to the searching for cooperative targets, that is targets which transmit a sonar signal, since targets which do not cooperate may be found by conventional means, such as by sonar or an underwater television camera.

In its broadest aspect, as shown by the schematic diagram in FIG. 6, the invention involves an apparatus 70 for determining the position in azimuth of a surface vessel, with respect to an underwater sonar signal source 72, irrespective of the motion of the surface vessel (50 in FIG. 5), comprising a hydrophone 12, capable of determining the azimuth of an underwater sonar signal source 72 with respect to the roll and pitch axes (56 and 58, FIG. 5) of the surface vessel 50. A universal joint (not shown in FIG. 6), connects the hydrophone 12 to the surface vessel (50 in FIG. 6), its two axes of rotation being the same as the roll and pitch axes (58 and 56 in FIG. 5) of the surface vessel 50, thereby permitting the hydrophone to rotate about the roll and pitch axes, 56 and 58, of the surface vessel.

A vertical reference 72, attached to the hydrophone 12 so as to pitch and roll with it, comprises a roll sensor 72R for determining the roll of the hydrophone and a pitch sensor 72P for determining the pitch of the hydrophone.

Digressing momentarily from FIG. 6, were it not for circuitry involving the pitch and roll sensors 74, and assuming there was something which tilted the hydrophone 12, such as a sudden yaw movement of the surface vessel 50, then, every time that the hydrophone moved, the dot on the x-y scope or the indicator on the x-y recorder would move, seeming to indicate that the vessel had moved, whereas in fact the vessel had not moved.

When the yaw of the vessel 50 causes the hydrophone 12 to tilt in pitch for example, the pitch sensor 74P senses the amount of the tilt and compensates for it. Even though a signal comes back from the hydrophone 12 indicating a displacement, a signal from the pitch sensor 74P comes back as an equal amount, thereby maintaining the dot on the scope at the desired position, as if the yaw of the vessel had not occurred.

Referring back to FIG. 6, a roll summer 76, whose two inputs are the outputs from the hydrophone 12 and the roll sensor 72R, and a pitch summer 78, whose two inputs are the outputs from the hydrophone and the pitch sensor 72P, serve to determine the true azimuth of the sonar signal source 72 with respect to the roll and pitch axes, 56 and 58 of FIG. 5, of the surface vessel 50, in spite of any roll or pitch of the hydrophone, or of the surface vessel.

If there were no pitch and roll of the hydrophone 12, neither the pitch sensor 74P nor the roll sensor 74R would send a signal to the roll and pitch summers 76 and 78, (through the roll and pitch preamps, discussed hereinbelow). The scope would then show the correct position of the spot showing the x and y coordinates of the signal source 72.

If there is a pitch and roll of the hydrophone 12, and no signals should emanate from the pitch and roll sensors 74P and 74R, then the spot due to the signal from the beacon 72 will be shown with the wrong x and y coordinates because of the pitch and roll of the hydrophone. However, in normal operation, the signals from the pitch and roll sensors 74 will ensure that the spot on the scope be shown with the correct x and y coordinates.

The position-determining apparatus 70 shown in FIG. 6 may further comprise means 82 for determining the depth of the sonar signal source 72 with respect to the surface of the water, located upon the surface vessel 50 and connected to the output of the roll and pitch summers, 76 and 78. The position-determining means 70 is thereby able to determine the range and the azimuth of the sonar signal source 72 with respect to the roll and pitch axes, 58 and 56 of FIG. 5, of the surface vessel 50.

The depth may be determined by a fathometer, or other external depth-finding means, and converted manually into a d-c voltage. The d-c voltage which corresponds to the depth of the signal source 72 is then applied to the proper circuitry so that, given an azimuth angle to the target signal source, the horizontal range of the signal source may be determined. This is shown very clearly in FIG. 5A. Effectively, the x and y coordinates of the signal source with respect to the station or support vessel 50 are derived, with the depth corresponding to the z-coordinate.

The position-determining apparatus 70 may further comprise means 84 for determining the presence of a valid target, connected to the input of the hydrophone 12. The "validate target" circuitry can determine the presence of a target by detecting a signal which has a magnitude greater than ambient noise. The method is described in the prior art. Roll and pitch mixers, 86 and 88, respectively, whose inputs are the outputs of the roll and pitch summers, 76 and 78, respectively, and the valid target determining means 84 provide an output only if a valid target, such as the sonar signal source 72, has been detected.

To obtain adequate signal amplification the position-determining apparatus would generally further comprise roll and pitch amplifiers, 92 and 94 connected between the outputs of the roll and pitch sensors, 74R and 74P, and the roll and pitch summers, 76 and 84, respectively, for amplifying the roll and pitch signals.

If still more amplification be needed, the position-determining apparatus 70 may further comprise roll and pitch channel amplifiers, 96 and 98, connected between the roll and pitch mixers, 86 and 88, respectively, and the depth-determining means 82, for amplifying the outputs of the roll and pitch mixers, respectively.

To secure adequate drive for the scope or plotter which displays the information, the position-determining apparatus 70 may further comprise roll and pitch channel drivers, 102 and 104, connected to the depth-determining means 82, for amplifying the outputs of the roll and pitch channels, 70R and 70P, respectively.

The position-determining apparatus 70 may further comprise an oscilloscope, whose input is connected to the outputs of the roll and pitch channel drivers, 102 and 104, for viewing the relative position of the surface vessel 50 with respect to the sonar signal source 72.

Figures 7A, 7C:
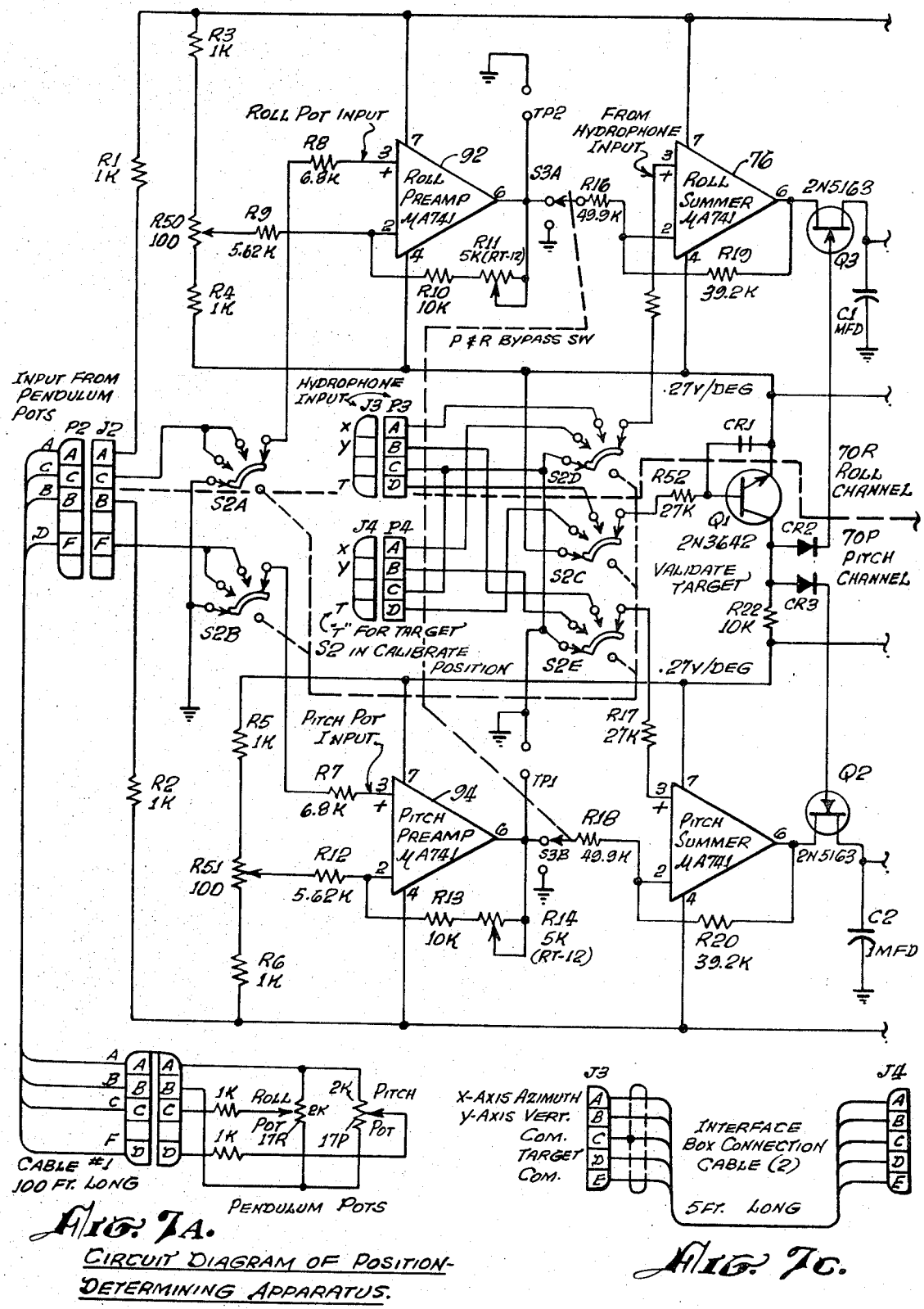
FIG. 7 is a circuit diagram of the position-determining apparatus.

FIG. 7 is a circuit diagram which corresponds to the schematic diagram shown in FIG. 6.

The outputs of the 2K pendulum potentiometers 17R and 17P, at the lower left-hand portion of the figure, feed into the P2–J2 plug. The pendulum roll signal enters pin 3 of roll preamplifier 92, where it is amplified.

Two inputs to roll summer 76 comprise the amplified roll pendulum output from roll preamp 92 and a roll error signal from the hydrophone through switch S2D and hydrophone input plug J3–P3.

The output at pin 6 of amplifier 76 indicates the true position of the signal source underneath the ship.

Another signal which is inserted into the roll channel circuit 70R is the depth signal developed across the depth pot 82R, which is introduced into the circuit manually, at the output of pin 6 of roll channel amplifier 96. At this output pin 6 of amplifier 96 there appears the combined hydrophone output, through plug J3 and pin 3 of roll summer 76, and the roll output through plug J2 and pin 3 of roll preamp 92.

The two outputs, the roll and hydrophone outputs, are combined with the depth signal at the output pin 6 of roll channel amplifier 96, and this becomes the input, at pin 3, to roll channel driver 102.

Therefore, at the output pin 6 of roll channel driver 102 appears information concerning the hydrophone roll angle, roll error, and depth input. Assume there is a 2° offset in the roll or pitch, and it appears on the scope as an offset of 2mm. If the depth, in a different situation, were 10 times as great, the range, as represented by the distance of the dot on the scope from the origin, would be 10 times further from the origin.

In a similar manner, in the pitch channel 70P signals corresponding to the pitch error, hydrophone pitch angle and depth are combined.

Tube Q1 is common to the pitch, roll, and hydrophone circuits, and is part of the "validate target" circuitry 84 of FIG. 6. Its purpose is to validate the fact that the hydrophone has acquired a target, the T on plugs J3 and J4 designating "target".

The depth potentiometers 82R and 82P are ganged together so that both portions are simultaneously set to the same value for both channels, the roll and pitch channels, 70R and 70P.

The circuits combine the signals from the pitch and roll circuits, from the depth circuit, and from the $x$- and $y$-circuits from the hydrophone and combines the input signals to give the true relation of the beacon to the surface vessel, which may be shown on the scope.

What is claimed is:

1. Apparatus for determining the position in azimuth of a surface vessel, with respect to an underwater sonar signal source, irrespective of the motion of the surface vessel, comprising;

a hydrophone, capable of determining the azimuth of an underwater sonar signal source with respect to the roll and pitch axes of the surface vessel;

a universal joint, connecting the hydrophone to the surface vessel, its two axes of rotation being the same as the roll and pitch axes of the surface vessel, thereby permitting the hydrophone to rotate about the roll and pitch axes of the surface vessel;

a vertical reference, attached to the hydrophone so as to pitch and roll with it, comprising:

a roll sensor for determining the roll of the hydrophone; and a pitch sensor for determining the pitch of the hydrophone;

a roll summer, whose two inputs are the outputs from the hydrophone and the roll sensor; and a pitch summer, whose two inputs are the outputs from the hydrophone and the pitch sensor;

the two summers serving to determine the true azimuth of the sonar signal source, with respect to the roll and pitch axes of the surface ship, in spite of any roll or pitch of the hydrophone, or of the surface vessel.

2. The position-determining apparatus according to claim 1, further comprising:

means for determining the depth of the sonar signal source with respect to the surface of the water, located upon the surface vessel and connected to the output of the roll and pitch summers;

the position-determining means thereby being able to determine the range and the azimuth of the sonar signal source with respect to the roll and pitch axes of the surface vessel.

3. The position determining apparatus according to claim 2, further comprising:

means for determining the presence of a valid target, connected to the input of the hydrophone, roll and pitch mixers, whose inputs are the outputs of the roll and pitch summers, respectively, and the valid target determining means, the mixers providing an output only if a valid target has been detected.

4. The position-determining apparatus according to claim 3, further comprising:

roll and pitch preamplifiers, connected between the outputs of the roll and pitch sensors and the roll and pitch summers, respectively, for amplifying the roll and pitch signals.

5. The position-determining apparatus according to claim 4, further comprising:
roll and pitch channel amplifiers, connected between the roll and pitch mixers, respectively, and the depth-determining means, for amplifying the outputs of the roll and pitch mixers, respectively.

6. The position-determining apparatus according to claim 5, further comprising:
roll and pitch channel drivers connected to the depth-determining means, for amplifying the outputs of the roll and pitch channels, respectively.

7. The position-determining apparatus according to claim 6, further comprising:
an oscilloscope, whose input is connected to the outputs of the roll and pitch channel output amplifiers, for viewing the relative position of the surface vessel with respect to the sonar signal source.

* * * * *